Aug. 23, 1938. H. WEIL 2,127,623
CLIP FOR MEATS AND THE LIKE
Filed Oct. 16, 1937
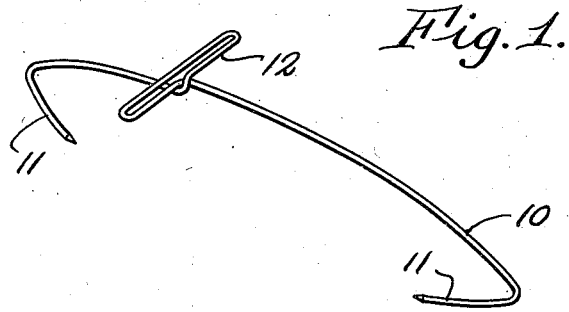
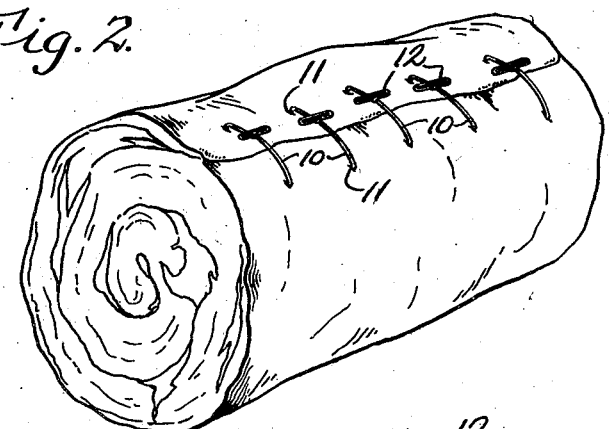
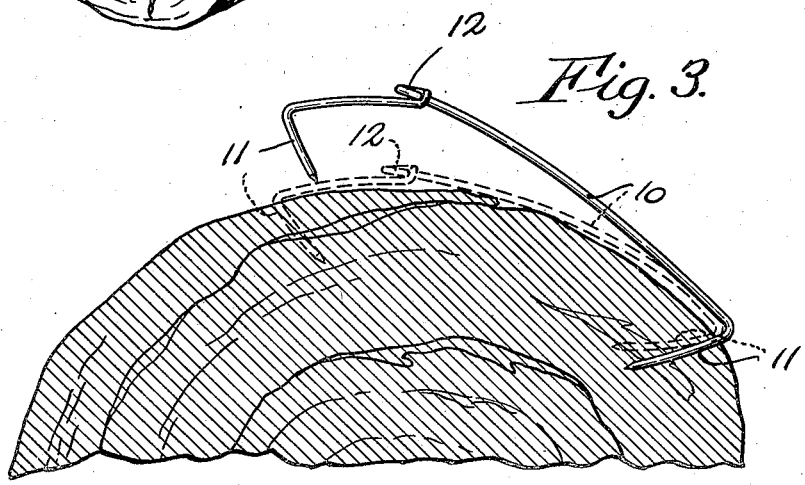
INVENTOR
Harry Weil
BY
Parker, Brackwow & Farmer
ATTORNEYS Patented Aug. 23, 1938

2,127,623

UNITED STATES PATENT OFFICE 2,127,623

CLIP FOR MEATS AND THE LIKE

Harry Weil, Buffalo, N. Y.

Application October 16, 1937, Serial No. 169,429

3 Claims. (Cl. 24—87)

This invention relates to clips or devices more particularly intended for use with meats, for holding portions thereof together or in place, or maintaining the meat in a desired form for cooking or other treatment or handling thereof. The devices are adapted, for instance, for use by butchers for securing or holding in shape a piece of boned meat which is rolled up or made up into a roll to facilitate its roasting or carving. Meats are commonly secured for such purposes by skewers stuck through the meat, or by tying strong cords about the pieces. These means, however, are objectionable. The skewers often are embedded and hidden in the meat and interfere with carving, and are hard to remove; and considerable time and trouble is involved in tying the meat with cords, and the cords are apt to be cut and parts thereof left in the carved pieces of meat, which is very objectionable.

The objects of my invention are to provide a clip or device which, while being of exceedingly simple and inexpensive construction, can be quickly and easily applied to the meat, will securely retain the meat in the desired form, and can be quickly and easily removed; also to provide a simple and inexpensive clip or device for the purpose intended, of such form that it can be grasped and firmly held when applying it, notwithstanding that the device or the user's hands may be slippery or greasy; also to provide a desirable and practical clip or device which has the other features of improvement and advantage hereinafter described and set forth in the claims.

In the accompanying drawing:

Fig. 1 is a perspective view of a clip or device embodying my invention.

Fig. 2 is a perspective view of a meat roll with several of the clips applied thereto for maintaining the roll in form.

Fig. 3 is a view showing the device in side elevation and illustrating the manner of applying the same to the meat.

The clip or device consists of a slender wire or rod 10, preferably of somewhat bowed form, having pointed hooks or prongs 11 at its opposite ends which extend more or less inwardly or towards each other and have sharp ends to adapt them to be easily stuck or forced into the meat or substance with which the clip is to be used. The clip is preferably made of metal wire of such stiffness or spring temper that the prongs can be readily stuck into meat without bending, and that while the clip can be straightened or deflected more or less out of its normal form in applying and removing it, nevertheless it is of sufficient stiffness to prevent the hooks from being spread or bent out and disengaged from the meat by the pull or tension of the meat on the prongs. Preferably, also the clip is made of stainless steel wire or other suitable material, or has a plated or other finish which will not rust, corrode or become unsanitary.

The clip is provided or formed between its hooked ends with a cross bar or finger piece 12 which is rigid with the body of the clip and extends laterally or crosswise thereof, transversely or perpendicularly to the plane of the prongs of the clip. This cross bar or finger piece forms a grip or handle which can be grasped by the fingers of the user and held in applying the clip to the meat and ensures a firm hold on the clip to facilitate applying it. As shown, the cross bar or finger piece 12 is formed by bending the wire, of which the clip is made, in the form of a flattened loop which projects laterally to opposite sides of the body of the clip. The complete clip with the cross bar is thus formed of a single integral piece of wire bent into the form clearly illustrated in Fig. 1.

In the use of the device, it may be applied to the meat roll or other body to be held in shape by sticking or forcing the prong at one end of the clip into one portion of the body, as illustrated at the right in Fig. 3, and then by straining or pulling on the clip toward another portion of the body to be secured, and more or less deflecting or straightening the bowed body of the clip, the prong at the other end of the clip is stuck or forced into the meat. The resilience or tendency of the clip to resume its normal bowed form will retain the prongs under tension in the meat and prevent the unintentional disengagement of the prongs, and the body of the clip will be held close against the surface of the meat, with the cross bar or finger piece lying close to or against the meat, as indicated in Fig. 2.

Thus, while the finger piece projects laterally from the clip body and affords a convenient part to insure a firm hold on the clip, nevertheless the finger piece, being transverse to the plane of the prongs, does not project or stick out from the surface of the meat so as to be liable to catch on an object and unintentionally disengage the clip, or to be apt to punch through the paper wrapping for the meat.

When it is desired to remove the clip from the meat, as for instance when a cooked piece of meat to which the clip has been applied is to be carved, the clip can be easily removed by grasping and pulling on the finger piece or by inserting the prong of a fork or other implement under one hooked end of the clip and pulling this out and then withdrawing the other hooked end.

The device in the form illustrated, being made of a single integral piece of wire, is exceedingly inexpensive to make and, therefore, the number of clips necessary to properly hold a piece of meat in the desired form or condition can be used without adding appreciably to the cost of the meat.

I claim as my invention:

1. A clip adapted for the purpose described, comprising a slender rod provided at opposite ends with inwardly deflected prongs which project to the same side from the rod, and provided between its ends with a finger piece in the form of a slender cross bar which is rigid with the rod and projects laterally to opposite sides therefrom approximately in the plane of the rod and transversely to the plane of the end prongs.

2. A clip adapted for the purpose described, comprising a slender rod body provided at opposite ends with pointed prongs which project to the same side from the body, and provided between its ends with a slender cross bar rigid with and lying approximately in the plane of the body of the clip and projecting laterally to opposite sides thereof transversely to the plane of the end prongs.

3. A clip adapted for the purpose described, comprising a single integral piece of wire bent to provide pointed prongs projecting from opposite ends of the clip and deflected towards each other, and a flattened loop in the form of a slender cross bar which is rigid with and projects laterally to opposite sides from the body of the clip transversely to the plane of the end prongs of the clip.

HARRY WEIL.